United States Patent
Xu

(10) Patent No.: US 12,035,050 B2
(45) Date of Patent: Jul. 9, 2024

(54) INFORMATION ACQUISITION DEVICE, METHOD, PATROL ROBOT AND STORAGE MEDIUM THAT ADJUSTS A LUMINANCE PARAMETER ACCORDING TO CONTRAST AND GRAYSCALE INFORMATION OF AN IMAGE

(71) Applicant: JINGDONG TECHNOLOGY INFORMATION TECHNOLOGY CO., LTD., Beijing (CN)

(72) Inventor: Zhetao Xu, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 252 days.

(21) Appl. No.: 17/634,470

(22) PCT Filed: Aug. 14, 2020

(86) PCT No.: PCT/CN2020/109214
§ 371 (c)(1),
(2) Date: Feb. 10, 2022

(87) PCT Pub. No.: WO2021/036824
PCT Pub. Date: Mar. 4, 2021

(65) Prior Publication Data
US 2022/0303447 A1    Sep. 22, 2022

(30) Foreign Application Priority Data

Aug. 28, 2019 (CN) .......................... 201910799851.X

(51) Int. Cl.
*H04N 5/335* (2011.01)
*G05D 1/00* (2006.01)
(Continued)

(52) U.S. Cl.
CPC .......... *H04N 23/74* (2023.01); *G05D 1/0246* (2013.01); *G06V 10/141* (2022.01); *G06V 20/52* (2022.01); *G06V 20/56* (2022.01); *H04N 23/64* (2023.01)

(58) Field of Classification Search
CPC .................................................... G06V 10/141
See application file for complete search history.

(56) References Cited

U.S. PATENT DOCUMENTS

| 2009/0028387 A1 | 1/2009 | Jeong et al. |
| 2016/0094770 A1 | 3/2016 | Chen |

(Continued)

FOREIGN PATENT DOCUMENTS

| CN | 101474064 A | 7/2009 |
| CN | 101750848 A | 6/2010 |

(Continued)

OTHER PUBLICATIONS

"Communication with Supplementary European Search Report", EP Application No. 20857764.3, Sep. 14, 2023, 7 pp.

(Continued)

*Primary Examiner* — Gary C Vieaux
(74) *Attorney, Agent, or Firm* — Myers Bigel, P.A.

(57) ABSTRACT

The present disclosure relates to an information acquisition device, method, patrol robot and storage medium, which relates to the technical field of robots. The information acquisition device includes: a photographing module configured to take an image in response to the acquisition of a photographing instruction; a light source driver configured to drive a light source connected to the light source driver to emit light according to a luminance parameter in the supplementary lighting instruction; an image processor configured to determine the photographing quality of the image; if the photographing quality of the image is greater than a preset (Continued)

value, recognize target information from the image; if the photographing quality is not greater than the preset value, redetermine the luminance parameter according to the image, send the photographing instruction to the photographing module, and send the supplementary lighting instruction including the luminance parameter to the light source driver.

18 Claims, 8 Drawing Sheets

(51) Int. Cl.
*G06V 10/141* (2022.01)
*G06V 20/52* (2022.01)
*G06V 20/56* (2022.01)
*H04N 23/60* (2023.01)
*H04N 23/74* (2023.01)

(56) References Cited

U.S. PATENT DOCUMENTS

| | | | |
|---|---|---|---|
| 2017/0202075 A1 | 7/2017 | Zhou et al. | |
| 2019/0077019 A1 | 3/2019 | Hickman et al. | |
| 2020/0275068 A1* | 8/2020 | Li | H04N 9/3155 |

FOREIGN PATENT DOCUMENTS

| | | | | |
|---|---|---|---|---|
| CN | 104144290 A | | 11/2014 | |
| CN | 104199453 A | | 12/2014 | |
| CN | 104698427 A | | 6/2015 | |
| CN | 109531533 A | | 3/2019 | |
| CN | 109685709 A | * | 4/2019 | ........... G06T 1/0014 |
| CN | 109685709 A | | 4/2019 | |
| CN | 109920220 A | | 6/2019 | |
| CN | 110460782 A | | 11/2019 | |
| CN | 110855900 A | * | 2/2020 | ............ G03B 15/03 |
| EP | 3195594 B1 | | 8/2019 | |

OTHER PUBLICATIONS

"First Office Action", CN Application No. 201910799851.X, Jul. 23, 2020, 9 pp.
"International Search Report and Written Opinion of the International Searching Authority with English language translation", International Application No. PCT/CN2020/109214, Nov. 20, 2020, 19 pp.
"Second Office Action", CN Application No. 201910799851.X, Feb. 9, 2021, 9 pp.

* cited by examiner

INFORMATION ACQUISITION DEVICE, METHOD, PATROL ROBOT AND STORAGE MEDIUM THAT ADJUSTS A LUMINANCE PARAMETER ACCORDING TO CONTRAST AND GRAYSCALE INFORMATION OF AN IMAGE

CROSS REFERENCE TO RELATED APPLICATIONS

The present disclosure is a U.S. National Stage Application under 35 U.S.C. § 371 of International Patent Application No. PCT/CN2020/109214, filed on Aug. 14, 2020, which is based on and claims priority of Chinese application for invention CN201910799851.X, filed on Aug. 28, 2019, the disclosure of both of which are hereby incorporated into this disclosure by reference in their entireties.

TECHNICAL FIELD

The present disclosure relates to the field of robots, and in particular, to an information acquisition device, a method, a patrol robot, and a storage medium for improving accuracy and efficiency.

BACKGROUND

With the development of information technology and Internet technology, the number of IDC (Internet Data Center) data rooms for storing Internet data services is also growing rapidly. The safe and efficient operation of IDC data rooms provides a basic guarantee for the stability of the Internet.

The application of IDC patrol robots is a way of replacing human patrol with robot patrol, which has the characteristics of high efficiency, simplicity and uninterrupted operation. An IDC robot automatically moves in a data center room and takes images during the movement to collect the working state of hosts.

SUMMARY

According to a first aspect of some embodiments of the present disclosure, there is provided an information acquisition device, comprising: a photographing module configured to take an image in response to acquiring a photographing instruction; a light source driver configured to, in response to acquiring a supplementary lighting instruction, drive a light source connected to the light source driver to emit light according to a luminance parameter in the supplementary lighting instruction; and an image processor connected with the photographing module and the light source driver and configured to adjust the luminance parameter according to the image, send the photographing instruction to the photographing module, and send the supplementary lighting instruction including the adjusted luminance parameter to the light source driver, if photographing quality of the image taken by the photographing module does not meet a preset condition.

In some embodiments, the image processor is further configured to adjust the luminance parameter according to contrast and grayscale information of the image.

In some embodiments, the image processor is further configured to: in condition that the contrast of the image is lower than a preset contrast value, decrease the luminance parameter if a pixel proportion of low grayscale regions of the image is lower than a preset low grayscale value, and increase the luminance parameter if a pixel proportion of high grayscale regions of the image is lower than a preset high grayscale value; or in condition that the contrast of the image is lower than the preset contrast value, decrease the luminance parameter if an average grayscale value of the image is greater than a preset upper grayscale limit, and increase the luminance parameter if the average grayscale value of the image is less than a preset lower grayscale limit.

In some embodiments, the image processor is further configured to send the photographing instruction to the photographing module and send the supplementary lighting instruction to the light source driver in response to receiving an information acquisition instruction from a main controller of a robot.

In some embodiments, the image processor is further configured to recognize target information from the image if the photographing quality meets the preset condition.

In some embodiments, the image processor is further configured to identify a category to which a device in the image belongs; determine a target region in the image; recognize target information from the target region using a model corresponding to the category to which the device in the image belongs if the photographing quality meets the preset condition.

In some embodiments, the image processor is further configured to adjust the luminance parameter using an adjustment step corresponding to the category to which the device in the image belongs if the photographing quality of the target region does not meet the preset condition.

In some embodiments, the information acquisition device further comprises: a supplementary lighting controller configured to obtain the supplementary lighting instruction from the image processor, determine the luminance parameter and add the determined luminance parameter to the supplementary lighting instruction if the luminance parameter is not included in the supplementary lighting instruction, and send the supplementary lighting instruction to a light source driving circuit.

In some embodiments, the information acquisition device further comprises: a light intensity sensor configured to sense an ambient light intensity and send the ambient light intensity to the supplementary lighting controller, so that the supplementary lighting controller determines the luminance parameter according to the ambient light intensity.

In some embodiments, the information acquisition device further comprises: a light source connected to the light source driver and configured to emit light as driven by the light source driver.

According to a second aspect of some embodiments of the present disclosure, there is provided a patrol robot, comprising: any of the foregoing information acquisition devices; and a main controller configured to receive and store target information from an image acquired by the information acquisition device.

In some embodiments, the main controller is further configured to send an information acquisition instruction to the image processor of the information acquisition device, wherein the information acquisition instruction is used to instruct the image processor to send the photographing instruction to the photographing module and send the supplementary lighting instruction to the light source driver.

In some embodiments, the main controller is further configured to instruct the patrol robot to travel according to a preset path comprising one or more information acquisition points, and send the information acquisition instruction to the image processor in response to the patrol robot reaching one of the information acquisition points.

In some embodiments, the main controller is further configured to control the patrol robot to stop or decelerate when the patrol robot reaches one of the information acquisition points and control the patrol robot to travel to a next information acquisition point at a preset speed in response to receiving the target information recognized by the image processor from the image.

According to a third aspect of some embodiments of the present disclosure, there is provided an information acquisition method, comprising: determining photographing quality of an acquired image; adjusting a luminance parameter used by a light source driver according to the image, sending a photographing instruction to a photographing module, and sending a supplementary lighting instruction including the adjusted luminance parameter to the light source driver, if the photographing quality does not meet a preset condition, wherein the photographing instruction is used to instruct the photographing module to take the image, and the supplementary lighting instruction is used to instruct the light source driver to drive a light source to emit light.

In some embodiments, the luminance parameter is adjusted according to contrast and grayscale information of the image.

In some embodiments, the adjusting the luminance parameter according to contrast and grayscale information of the image comprises: in condition that the contrast of the image is lower than a preset contrast value, decreasing the luminance parameter if a pixel proportion of low grayscale regions of the image is lower than a preset low grayscale value; increasing the luminance parameter if a pixel proportion of high grayscale regions of the image is higher than a preset high grayscale value; or in condition that the contrast of the image is lower than the preset contrast value, decreasing the luminance parameter if an average grayscale value of the image is greater than a preset upper grayscale limit; increasing the luminance parameter if the average grayscale value of the image is less than a preset lower grayscale limit.

In some embodiments, the information acquisition method further comprises: sending the photographing instruction to the photographing module and sending the supplementary lighting instruction to the light source driver in response to receiving an information acquisition instruction from a main controller of a patrol robot.

In some embodiments, the information acquisition method further comprises: recognizing target information from the image if the photographing quality meets the preset condition.

In some embodiments, the information acquisition method further comprises: identifying a category to which a device in the image belongs, and determining a target region from the image; and recognizing target information from the target region using a model corresponding to the category to which the device in the image belongs if the photographing quality meets the preset condition.

In some embodiments, the luminance parameter is adjusted using an adjustment step corresponding to the category to which the device in the image belongs if the photographing quality does not meet the preset condition.

In some embodiments, the information acquisition method further comprises: instructing, by a main controller, a patrol robot to travel according to a preset path, wherein the path comprises one or more information acquisition points; sending an information acquisition instruction by the main controller in response to the patrol robot reaching one of the information acquisition points.

In some embodiments, the information acquisition method further comprises: controlling, by the main controller, the patrol robot to stop or decelerate when the patrol robot reaches one of the information acquisition points; controlling, by the main controller, the patrol robot to travel to a next information acquisition point at a preset speed in response to receiving the target information.

According to a fourth aspect of some embodiments of the present disclosure, there is provided an information acquisition device, comprising: a memory; a processor coupled to the memory, the processor configured to, based on instructions stored in the memory, carry out any one of the foregoing information acquisition methods.

According to a fifth aspect of some embodiments of the present disclosure, there is provided a non-transitory computer-readable storage medium on which a computer program is stored, wherein the program when executed by a processor carries out any of the above information acquisition methods.

Other features and advantages of the present invention will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

Figure 1:
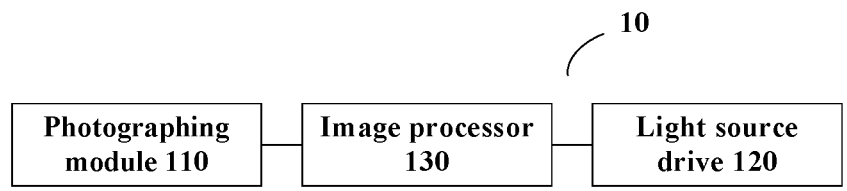
FIG. 1 is a structural diagram of an information acquisition device according to some embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

After further analysis, the inventor found that, in the case of a dark computer room, the quality of images obtained is low. This will reduce the accuracy of image recognition, resulting in collected information that is inaccurate and low acquisition efficiency. An embodiment of the present disclosure can provide a more accurate and efficient information acquisition scheme.

One technical problem to be solved by the embodiments of the present disclosure is: how to improve the accuracy and efficiency of information acquisition.

FIG. 1 is a structural diagram of an information acquisition device according to some embodiments of the present disclosure. As shown in FIG. 1, the information acquisition device 10 of the embodiments includes a photographing module 110, a light source driver 120 and an image processor 130, wherein the image processor 130 is connected to the photographing module 110 and the light source driver 120 respectively.

The photographing module 110 is configured to take an image in response to acquiring a photographing instruction. The light source driver 120 is configured to, in response to a supplementary lighting instruction, drive a light source connected to the light source driver to emit light according to a luminance parameter in the supplementary lighting instruction. Thus, the photographing module 110 can take images in an environment with illumination.

In some embodiments, the image processor 130 is configured to send the photographing instruction to the photographing module 110 and send the supplementary lighting instruction to the light source driver 120 in response to receiving an information acquisition instruction from a main controller of a robot. Thus, the image processor can instruct the photographing module and the light source driver to work together to collect images under illumination. As required, other devices or components may also be used to send the photographing instruction to the photographing module 110.

In some embodiments, the luminance parameter is set by the image processor 130, or by other components in the information acquisition device 10, or is default.

There are complex and changeable computer room environments. There may still be a case where the quality of the captured image is low if a fixed light intensity is used for supplementary lighting. The image processor 130 in the information acquisition device of the embodiments of the present disclosure can further determine whether the captured image is a qualified image.

The image processor 130 is further configured to adjust the luminance parameter according to the image, send the photographing instruction to the photographing module, and send the supplementary lighting instruction including the luminance parameter to the light source driver if the photographing quality of the image taken by the photographing module 110 does not meet a preset condition, i.e., in the case of poor photographing quality.

In some embodiments, the image processor 130 is further configured to recognize target information from the image if the photographing quality meets the preset condition, i.e., in the case of good photographing quality.

In some embodiments, the image processor 130 is further configured to determine a quality parameter of the image according to contrast and grayscale information of the acquired image, so as to determine whether the image quality meets a preset condition. It is difficult to distinguish edges, corners and other features from the image in the recognition process if the contrast of the image is low, resulting in the difficulty of accurately recognizing information from the image. Therefore, a quality parameter is determined based on image contrast. For example, image contrast is directly used as the quality parameter, or the quality parameter is determined according to a preset correspondence between image contrast and the quality parameter.

Too high or too low ambient light intensity can result in a low contrast of the image if the photographing quality is not greater than a preset value. A low ambient light intensity may lead to more noises in the image, which is not conducive to the recognition of target information in the image; a too high ambient light intensity may cause a high degree of saturation of some areas in the image, which is also not conducive to image segmentation and other processing. Therefore, in some embodiments, if the contrast of the image is lower than a preset contrast value, the luminance parameter is redetermined by further extracting grayscale information of the image.

As an example, the grayscale information may be grayscale values on various grayscales of the image, if a pixel proportion of low grayscale regions of the image is lower than a preset low grayscale value, that is, there are some missing low grayscale regions on the grayscale histogram of the image, it indicates that the current ambient light intensity is too high and the image is too bright; if a pixel proportion of high grayscale regions of the image is greater than a preset high grayscale value, that is, there are some missing high grayscale regions on the grayscale histogram of the image, it indicates that the current ambient light intensity is too low and the image is too dark.

As an example, the grayscale information may be an average grayscale value of the image, if the average grayscale value of the image is greater than a preset upper grayscale limit, it indicates that the current ambient light intensity is too high and the image is too bright; if the average grayscale value of the image is less than a preset lower grayscale limit, it indicates that the current ambient light intensity is too low and the image is too dark.

In some embodiments, grayscale information of the image is acquired, and the luminance parameter is re-adjusted according to the contrast and grayscale information of the image. For example, a corresponding relationship between contrast, grayscale information, and luminance parameter adjustment values can be set in advance, for example, in the form of a correspondence table, formula, etc.; then, the luminance parameter used in the previous photographing is adjusted by using a luminance parameter adjustment value. The luminance parameter adjustment value is a negative value if the image is too bright; and the luminance parameter adjustment value is a positive value if the image is too dark.

In the case where the photographing quality is greater than a preset value, in some embodiments, the image processor 130 is further configured to identify a category to which a device in the image belongs; determine a target region in the image; recognize target information from the target region using a model corresponding to the category to which the device in the image belongs.

In a computer room, target information to be collected includes, for example, information represented by indicator lights, display screens, or labels. For chassis of different models, target information may be represented in different forms. Therefore, a target region can be determined according to the location or distinctive features of the target information of this model through determining the model of a chassis by determining a category to which a device in the image belongs. For example, for an indicator light, the target information can be recognized by a model with color recognition function; as another example, for a display screen or label, the target information can be recognized by a model with character recognition function.

In some embodiments, the photographing quality of the image is determined according to the photographing quality of the target region of the image. For example, contrast and grayscale information of the target region can be calculated, so that the adjusted luminance parameter is more accurate.

In some embodiments, if the photographing quality of the target region of the image does not meet the preset condition, the luminance parameter is adjusted using an adjustment step corresponding to the category to which the device in the image belongs. For example, an indicator light has less details, and a larger step can be used accordingly to adjust the luminance; as another example, text information has many details, and a smaller step can be used accordingly to adjust the luminance to avoid missing the optimal luminance due to excessive adjustment.

In the method of the above embodiments, the photographing module and the light source driver can work together to collect images under illumination. Moreover, if the image processor detects that the quality of the captured image is relatively low, through instructing the photographing module and the light source driver to work again after adjusting the luminance parameter, a higher quality image can be obtained, thereby improving the accuracy of image recognition. Therefore, the embodiments of the present disclosure can improve the accuracy and efficiency of information acquisition.

Figure 2:
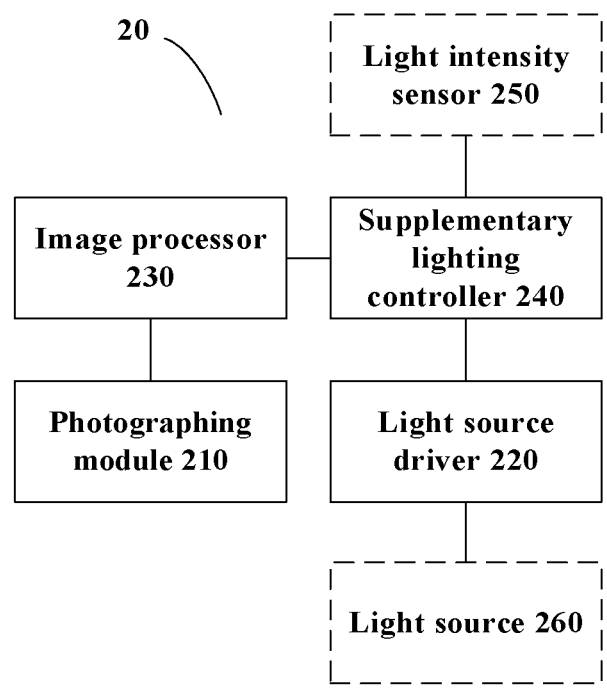
FIG. 2 is a structural diagram of an information acquisition device according to other embodiments of the present disclosure.

In some embodiments, a supplementary lighting controller is used to further control the light source driver. FIG. 2 is a structural diagram of an information acquisition device according to other embodiments of the present disclosure.

As shown in FIG. 2, the information acquisition device 20 of the embodiments comprise a photographing module 210, a light source driver 220, an image processor 230 and a supplementary lighting controller 240. The image processor 230 is respectively connected with the photographing module 210 and the supplementary lighting controller 240, and the light source driver 220 is connected with the supplementary lighting controller 240. The supplementary lighting controller 240 is configured to acquire a supplementary lighting instruction from the image processor; if the luminance parameter is not included in the supplementary lighting instruction, determine the luminance parameter and add the determined luminance parameter to the supplementary lighting instruction; and send the supplementary lighting instruction to a light source driving circuit.

In some embodiments, after receiving an information acquisition instruction from a main controller of a robot, if the supplementary lighting instruction is sent for the first time, the image processor 230 can choose to set no luminance parameter in the supplementary lighting instruction because the current ambient light intensity is not determined. A default luminance value is determined as the value of the luminance parameter if the supplementary lighting controller 240 detects that the luminance parameter is not included in the supplementary lighting instruction; alternatively, the current ambient light intensity can be obtained from other modules, and the luminance parameter can be determined according to the current ambient light intensity, for example, by looking up a correspondence table of preset ambient light intensity values and luminance parameter values.

In some embodiments, the information acquisition device 20 further includes a light intensity sensor 250 configured to sense the ambient light intensity, and send the ambient light intensity to the supplementary lighting controller 240, so that the supplementary lighting controller 240 can determine the luminance parameter according to the ambient light intensity. Thus, supplementary lighting can be performed during photographing according to the ambient light intensity if the image processor does not indicate the luminance parameter.

In some embodiments, the information acquisition device 20 may further include a light source 260. The light source 260 is connected to the light source driver 220 and configured to emit light as driven by the light source driver 220.

Figure 3:
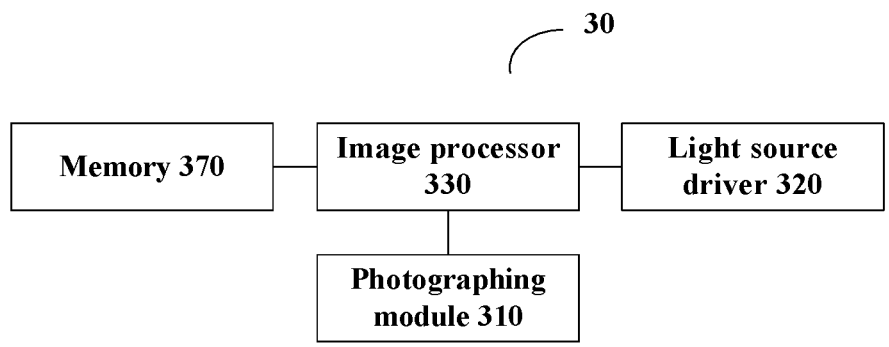
FIG. 3 is a structural diagram of an information acquisition device according to still other embodiments of the present disclosure.

FIG. 3 is a structural diagram of an information acquisition device according to still other embodiments of the present disclosure. As shown in FIG. 3, the information acquisition device 30 of the embodiments includes a photographing module 310, a light source driver 320, an image processor 330 and a memory 370. The memory 370 is connected to the image processor 330, and is configured to store calculation data of the image processor 330. Thus, the calculation efficiency of the image processor is improved.

Figure 4:
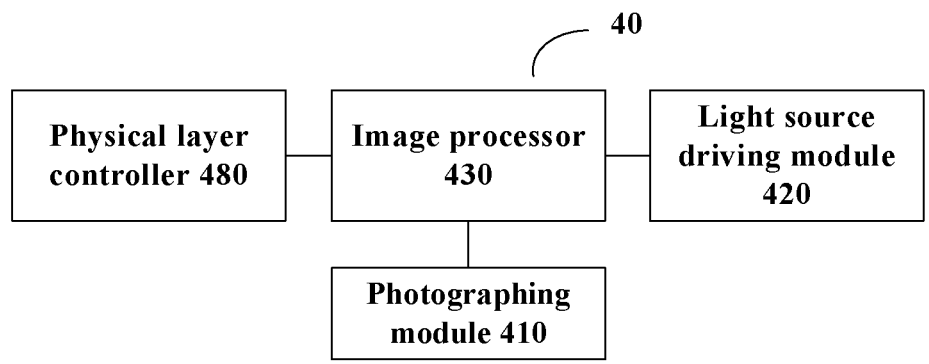
FIG. 4 is a structural diagram of an information acquisition device according to still other embodiments of the present disclosure.

FIG. 4 is a structural diagram of an information acquisition device according to still other embodiments of the present disclosure. As shown in FIG. 4, the information acquisition device 40 of the embodiments includes a photographing module 410, a light source driver 420, an image processor 430 and a physical layer controller 480 connected with an Ethernet interface of the image processor 430 and is configured to realize the communication between the image processor 430 and a main controller of a robot through Ethernet. The physical layer controller 480 is a physical interface transceiver that forms an Ethernet controller together with an Ethernet media intervention controller of the image processor 430, so as to realize the function of the network interface. Thus, the information acquisition device 40 can flexibly communicate with other devices through Ethernet.

The various modules and elements of the information acquisition device provided by the embodiments of the present disclosure can be implemented by more specific means. An implementation of the information acquisition device of the present disclosure will be described below with reference to FIG. 5.

Figure 5:
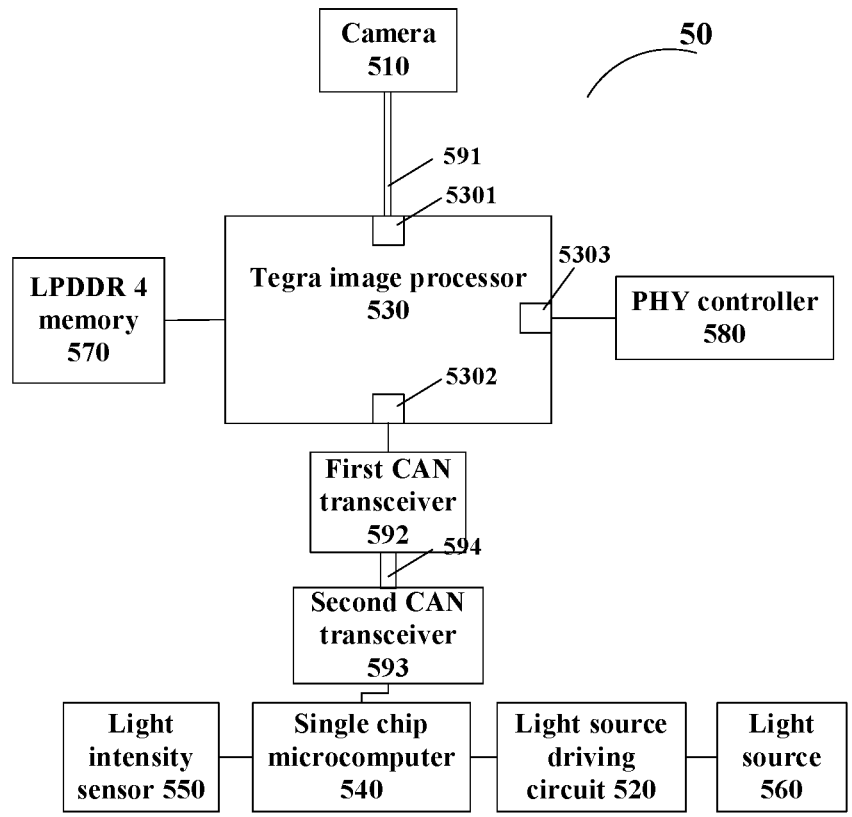
FIG. 5 is a structural diagram of an information acquisition device according to still other embodiments of the present disclosure.

FIG. 5 is a structural diagram of an information acquisition device according to still other embodiments of the present disclosure. As shown in FIG. 5, the information acquisition device 50 of the embodiments include: a camera 510, a light source driving circuit 520, an NVIDIA Tegra image processor 530, a single chip microcomputer 540, a light intensity sensor 550, a light source 560, a LPDDR 4 (Low Power Double Data Rate 4) memory 570 and a PHY (Port Physical Layer) controller 580.

A USB interface 5301 of the Tegra image processor 530 is connected to one end of the USB data line 591, and the other end of the USB data line 591 is connected to the camera 510. Thus, photographing instructions of the Tegra image processor 530 can be transmitted to the camera 510 through the USB data line 591, and images captured by the camera 510 can be transmitted to the Tegra image processor 530 through the USB data line 591.

A CAN peripheral interface 5302 of the Tegra image processor 530 is connected with a first CAN transceiver 592, the single chip microcomputer 540 as a supplementary lighting controller is connected with a second CAN transceiver 593, and the first CAN transceiver 592 is connected with the second CAN transceiver 593 through a CAN bus 594. The first CAN transceiver 592 and the second CAN transceiver 593 are configured to perform conversion of logic levels on the device side and differential levels on the CAN bus side.

The single chip microcomputer 540 is connected with the light intensity sensor 550 and the light source driving circuit 520 respectively, and the light source driving circuit 520 is connected with the light source 560.

An Ethernet interface 5303 of the Tegra image processor 530 is connected with the PHY controller 580. In addition, the Tegra image processor 530 is further connected with the LPDDR4 memory 570.

An exemplary information acquisition process will be described below with reference to FIG. 5.

When a patrol robot reaches a preset position along a patrol path, a main controller of the patrol robot sends an information acquisition instruction to Tegra image processor 530 through Ethernet.

After receiving the information acquisition instruction, the Tegra image processor 530 sends a photographing instruction to the camera 510 through the USB interface 5301, and sends a supplementary lighting instruction to the single chip microcomputer 540 through the CAN peripheral interface 5302.

The single chip microcomputer 540 finds that there is no luminance parameter in the supplementary lighting instruction, so it obtains an ambient light intensity from the light intensity sensor 550, and determines the luminance parameter according to the ambient light intensity. The single chip microcomputer 540 adds the luminance parameter to the supplementary lighting instruction, and sends the supplementary lighting instruction to the light source driving circuit 520. The light source driving circuit 520 drives the light source 560 to emit light according to the luminance parameter in the supplementary lighting instruction. Thus, when the camera 510 captures an image according to the photographing instruction, supplementary lighting is performed using the light source 560.

The camera 510 transmits the captured image to the Tegra image processor 530, and then the Tegra image processor 530 determines the photographing quality of the image, and determines whether the photographing quality is greater than a preset value. Target information is recognized from the image if the photographing quality is greater than the preset value, and the recognized information is sent to the main controller of the patrol robot through the Ethernet interface 5303. The luminance parameter is redetermined according to the image, a photographing instruction is sent to the camera 510, and a supplementary lighting instruction including the luminance parameter is sent to the light source driving circuit 520 if the photographing quality is not greater than the preset value.

The single chip microcomputer 540 finds that there is a luminance parameter in the supplementary lighting instruction, so it sends the supplementary lighting instruction to the light source driving circuit 520. The light source driving circuit 520 drives the light source 560 to emit light according to the luminance parameter in the supplementary lighting instruction. Thus, when the camera 510 captures an image according to the photographing instruction, supplementary lighting is performed by the light source 560, and the light supplement effect is adjusted according to the last photographing quality and the captured image.

The camera 510 transmits the recaptured image to the Tegra image processor 530, and then the Tegra image processor 530 continues to process according to the aforementioned processing logic. The luminance parameter is determined again and the photographing and supplementary lighting process is triggered if the photographing quality of this captured image is still not greater than the preset value, until an image with the photographing quality greater than the preset value is obtained.

Upon the main controller has obtained the target information of the current position, the patrol robot is driven to a next position and repeat the above process.

The above embodiments use the light intensity sensor to obtain an initial luminance parameter for supplementary lighting, and the luminance parameter is adjusted to take an image again if the initial photographing quality is low. Thus, target information can be recognized from a high-quality image, and the accuracy and efficiency of information acquisition in the process of automatic patrol in a computer room can be improved.

Embodiments of the patrol robot of the present disclosure will described below with reference to FIG. 6.

Figure 6:
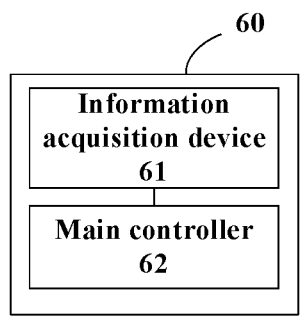
FIG. 6 is a structural diagram of a patrol robot according to some embodiments of the present disclosure.

FIG. 6 is a structural diagram of a patrol robot according to some embodiments of the present disclosure. As shown in FIG. 6, the information acquisition device 60 of the embodiments comprise an information acquisition device 61 and a main controller 62. The main controller 62 is configured to receive and store the target information recognized from the image acquired by the information acquisition device 61.

In some embodiments, the main controller 62 is further configured to send an information acquisition instruction to the image processor of the information acquisition device, so that the image processor sends a photographing instruction to the photographing module and sends a supplementary lighting instruction to the light source driver in response to the information acquisition instruction.

In some embodiments, the main controller 62 is further configured to store a preset path and information acquisition points on the path; instruct the patrol robot to travel along the preset path; send the information acquisition instruction to the image processor of the information acquisition device in response to reaching one of the information acquisition points.

In some embodiments, the main controller 62 is further configured to control the patrol robot to stop or decelerate when the patrol robot reaches one of the information acquisition points; control the patrol robot to travel to a next information acquisition point at a preset speed in response to receiving target information in the image from the image processor.

Embodiments of the information acquisition method of the present disclosure will be described below with reference to FIG. 7.

Figure 7:
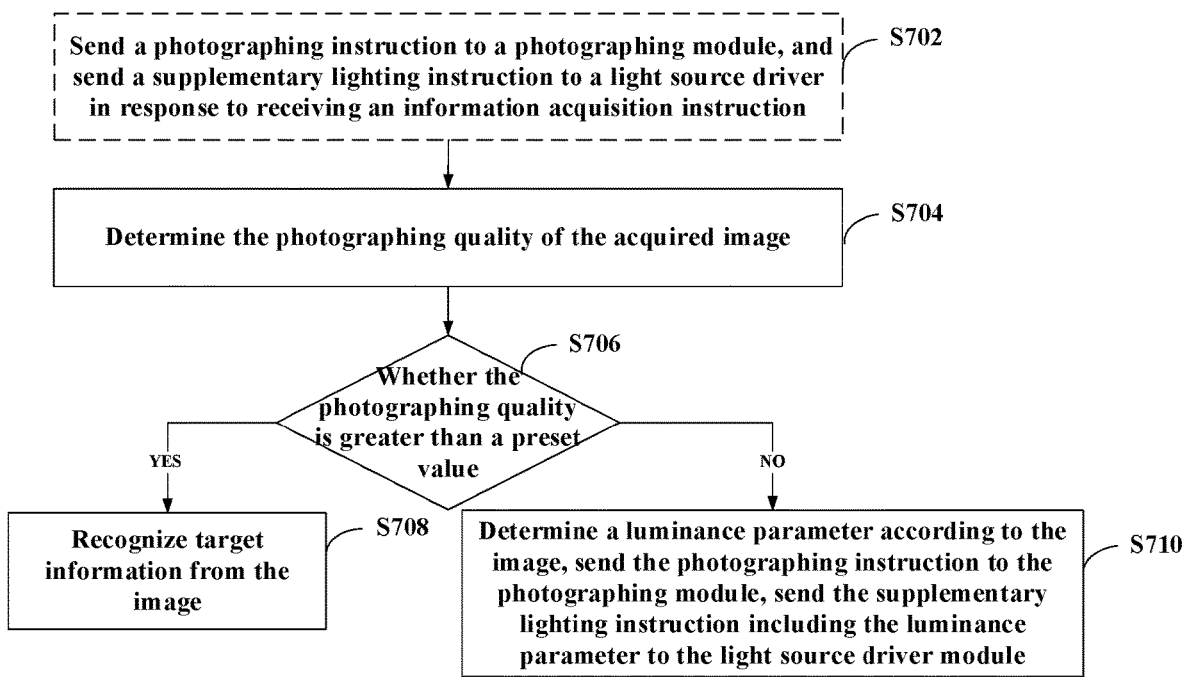
FIG. 7 is a flowchart of an information acquisition method according to some embodiments of the present disclosure.

FIG. 7 is a flowchart of an information acquisition method according to some embodiments of the present disclosure. As shown in FIG. 7, the information acquisition method of the embodiments include steps S702 to S710.

In step S702, a photographing instruction is sent to a photographing module, and a supplementary lighting instruction is sent to a light source driver in response to receiving an information acquisition instruction from the main controller of a robot, so that the photographing module captures an image in response to the acquisition of the photographing instruction, and the light source driver drives the light source to emit light in response to the acquisition of the supplementary lighting instruction.

In some embodiments, step S702 is optionally performed as needed.

In step S704, the photographing quality of the acquired image is determined.

In some embodiments, the photographing quality of the image taken by the photographing module is determined according to contrast information of the image.

In step S706, it is determined whether the photographing quality meets a preset condition.

In step S708, target information is recognized from the image if the photographing quality meets the preset condition.

In step S710, a luminance parameter used by the light source driver is adjusted according to the image, a photographing instruction is sent to the photographing module, and a supplementary lighting instruction including the adjusted luminance parameter is sent to the light source driver if the photographing quality does not meet the preset condition. In some embodiments, after performing step S710, the method returns to step S704 until the target information is recognized in the case of a photographing quality that meets the preset condition.

In the method of the above embodiments, the photographing module and the light source driver can work together to collect images under illumination. Moreover, if the image processor detects that the quality of the captured image is relatively low, through instructing the photographing module and the light source driver to work again after adjusting the luminance parameter, a high-quality image can be obtained, thereby improving the accuracy of image recognition. Thus, the accuracy and efficiency of information acquisition are improved.

Too high or too low ambient light intensity can result in a low image contrast if the photographing quality is not greater than a preset value. In some embodiments, grayscale information of the image is acquired, and the luminance parameter is redetermined according to the contrast and grayscale information of the image. Embodiments of adjusting the luminance parameter will be described below with reference to FIGS. 8*a* and 8*b*, respectively.

Figure 8A:
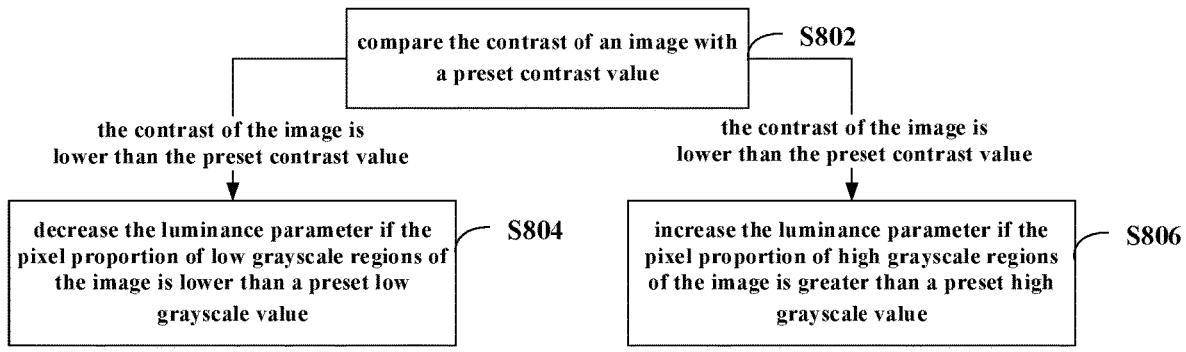
FIGS. 8A and 8B are flowchart of a method for adjusting a luminance parameter according to some embodiments of the present disclosure.

FIG. 8A shows a flowchart of a luminance parameter adjustment method according to some embodiments of the present disclosure. As shown in FIG. 8*a*, the method of the embodiments include steps S802 to S806.

In step S802, the contrast of an image is compared with a preset contrast value. steps S804 and S806 are performed if the contrast of the image is lower than the preset contrast value.

In some embodiments, if the contrast of the image is lower than the preset contrast value, it is determined that it is not necessary to capture an image again.

In step S804, the luminance parameter is decreased if the pixel proportion of low grayscale regions of the image is lower than a preset low grayscale value.

In step S806, the luminance parameter is increased if the pixel proportion of high grayscale regions of the image is greater than a preset high grayscale value.

It indicates that the current ambient light intensity is too high and the image is too bright if there are some missing low grayscale regions on the grayscale histogram of the image; it indicates that the current ambient light intensity is too low and the image is too dark if there are some missing high grayscale regions on the grayscale histogram of the image. Through the above embodiments, the luminance parameter can be reasonably redetermined, so that a high-quality image can be obtained in the next photographing.

Figure 8B:
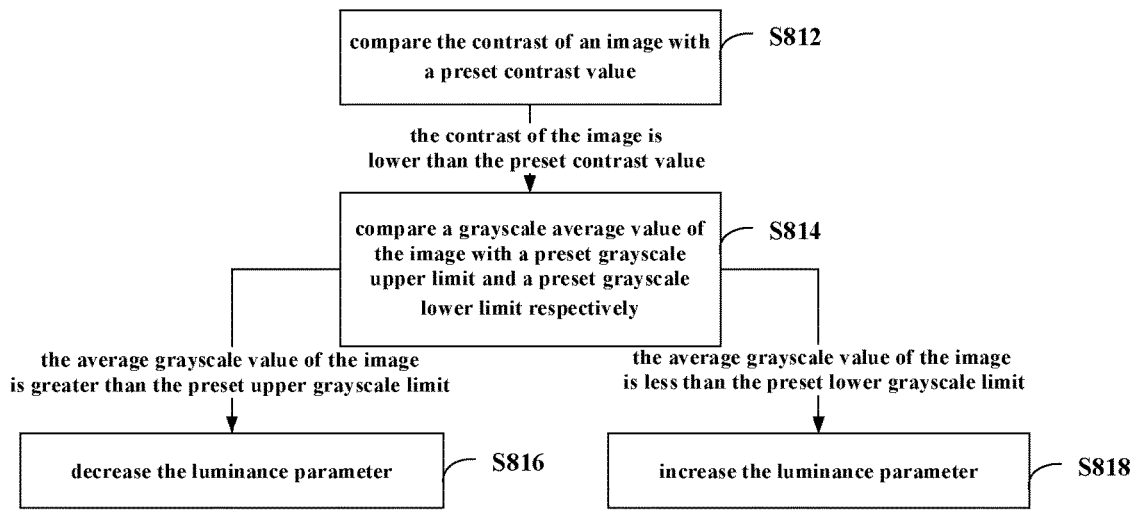

FIG. 8B shows a flowchart of a luminance parameter adjustment method according to some embodiments of the present disclosure. As shown in FIG. 8B, the method of the embodiments include steps S812 to S818.

In step S812, the contrast of an image is compared with a preset contrast value. Step S814 is performed if the contrast of the image is lower than the preset contrast value.

In step S814, a grayscale average value of the image is compared with a preset grayscale upper limit and a preset grayscale lower limit, respectively. Step s816 is performed if the average grayscale value of the image is greater than the preset upper grayscale limit; step s818 is performed if the average grayscale value of the image is less than the preset lower grayscale limit.

In step S816, the luminance parameter is decreased.

In step S818, the luminance parameter is increased.

It indicates that the current ambient light intensity is too high and the image is too bright if the average grayscale value of the image is greater than a preset upper grayscale limit; it indicates that the current ambient light intensity is too low and the image is too dark if the average grayscale value of the image is less than a preset lower grayscale limit. The luminance parameter can be reasonably redetermined through the above embodiments, so that a high-quality image can be obtained in the next photographing.

Embodiments of a target information recognition method of the present disclosure will be described below with reference to FIG. 9.

Figure 9:
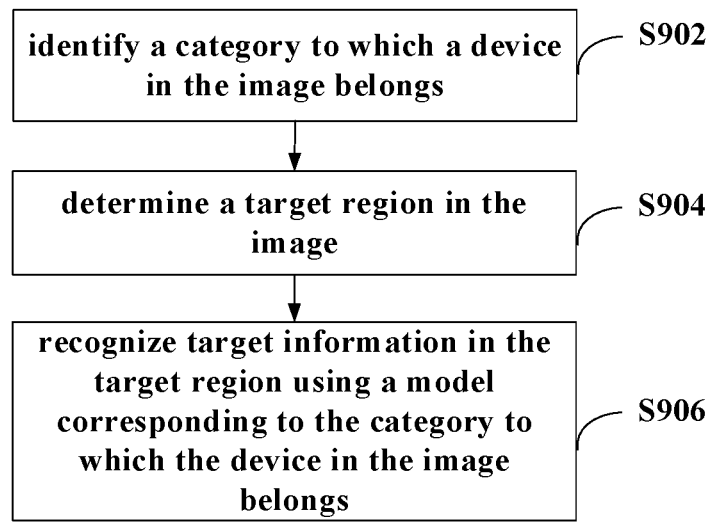
FIG. 9 is a flowchart of a target information recognition method according to some embodiments of the present disclosure.

FIG. 9 is a flowchart of a target information recognition method according to some embodiments of the present disclosure. As shown in FIG. 9, the target information recognition method of the embodiments include steps S902 to S906.

In step S902, a category to which a device in the image belongs is identified.

In some embodiments, sample images of devices are acquired for various categories in advance, and categories are labeled for device regions in the images; then, a machine learning model for classification, such as a target detection model (YOLO3 model), is trained using these sample images. Thus, the trained model can be used to recognize the category to which a device in an image belongs.

In step S904, a target region in the image is determined. For example, a target region in the image is determined by a target detection algorithm.

In step S906, target information in the target region is recognized using a model corresponding to the category to which the device in the image belongs if the photographing quality meets a preset condition.

In some embodiments, the luminance parameter is adjusted using an adjustment step corresponding to the category to which the device in the image belongs if the photographing quality does not meet the preset condition.

By using corresponding models to identify different types of devices, the accuracy of information collection is improved.

A patrol process of a patrol robot of the present disclosure will be described below with reference to FIG. 10.

Figure 10:
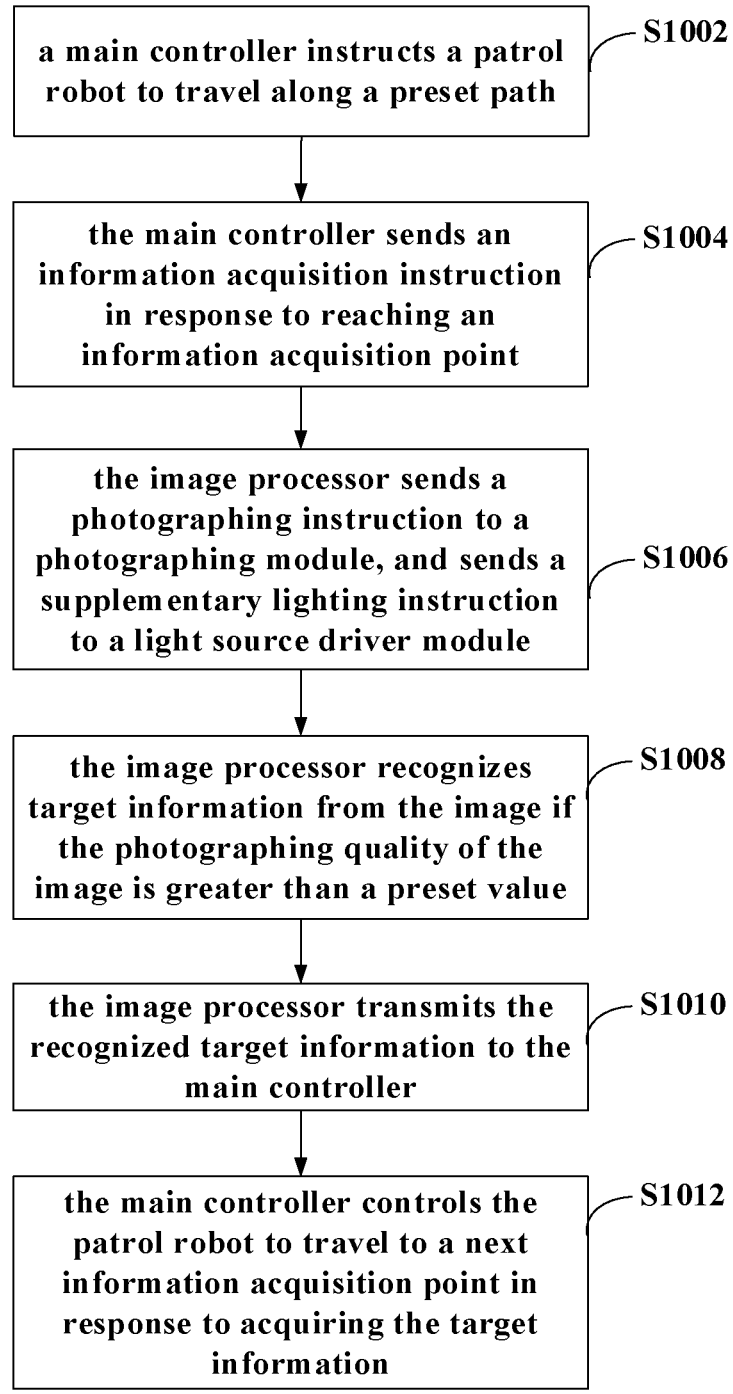
FIG. 10 is a flowchart of a patrol method according to some embodiments of the present disclosure.

FIG. 10 is a flowchart of a patrol method according to some embodiments of the present disclosure. As shown in FIG. 10, the patrol method of the embodiments includes steps S1002 to S1012.

In step S1002, a main controller instructs a patrol robot to travel along a preset path, wherein the path includes one or more information acquisition points.

In step S1004, the main controller sends an information acquisition instruction to an image processor of an information acquisition device in response to reaching an information acquisition point.

In step S1006, a photographing instruction is sent to a photographing module, and a supplementary lighting instruction is sent to a light source driver in response to receiving the information acquisition instruction from the main controller of the robot, so that the photographing module captures an image in response to the acquisition of the photographing instruction, and the light source driver drives the light source to emit light in response to the acquisition of the supplementary lighting instruction.

In step S1008, the image processor determines whether to redetermine a luminance parameter and take an image with supplementary lighting according to the photographing quality of the captured image. Target information is recognized from the image if the photographing quality of the image is greater than a preset value.

In step S1010, the image processor transmits the recognized target information to the main controller.

In step S1012, in response to acquiring the target information, the main controller controls the patrol robot to travel to a next information acquisition point. In some embodiments, the method turns to step S1004 after step S1012.

In some embodiments, when the patrol robot reaches an information acquisition point, the main controller controls the patrol robot to stop or decelerate to obtain a high-quality image. The main controller controls the patrol robot to travel to a next information acquisition point at a preset speed in response to acquiring the target information, so as to improve the efficiency of information acquisition.

Thus, the process of high-quality image acquisition is automatically completed by the patrol robot, making the acquired information more accurate, and the acquisition process more efficient.

Figure 11:
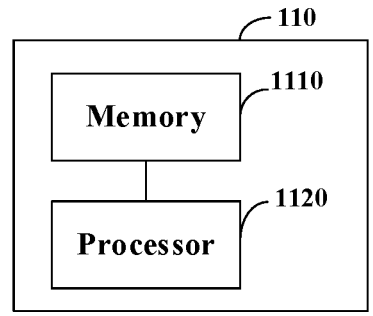
FIG. 11 is a structural diagram of an information acquisition device according to still other embodiments of the present disclosure.

FIG. 11 is a structural diagram of an information acquisition device according to still other embodiments of the present disclosure. As shown in FIG. 11, the information acquisition device 110 of the embodiments includes: a memory 1110 and a processor 1120 coupled to the memory 1110, the processor 1120 configured to, based on instructions stored in the memory 1110, carry out the information acquisition method according to any one of the foregoing embodiments.

The memory 1110 may include, for example, system memory, a fixed non-volatile storage medium, or the like. The system memory stores, for example, an operating system, application programs, a boot loader (Boot Loader), and other programs.

Figure 12:
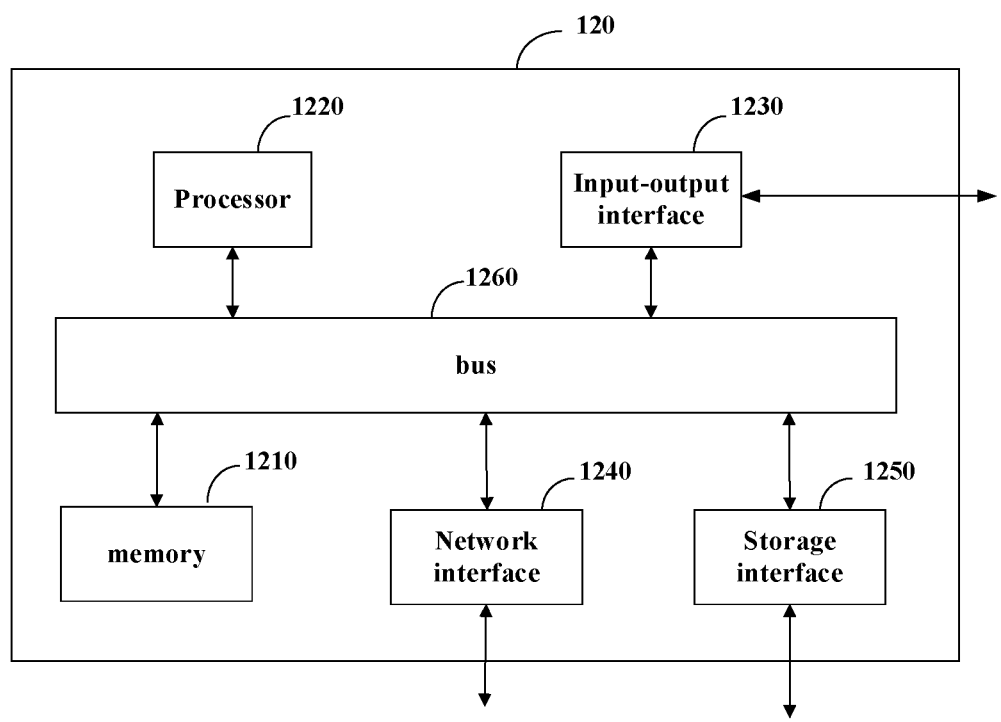
FIG. 12 is a structural diagram of an information acquisition device according to still other embodiments of the present disclosure.

FIG. 12 is a structural diagram of an information acquisition device according to still other embodiments of the present disclosure. As shown in FIG. 12, the information acquisition device 120 of the embodiments comprises: a memory 1210 and a processor 1220, and may further include an input-output interface 1230, a network interface 1240, a storage interface 1250, and the like. These interfaces 1230, 1240, 1250 and the memory 1210 and the processor 1220 may be connected through a bus 1260, for example. The input-output interface 1230 provides a connection interface for input-output devices such as a display, a mouse, a keyboard, and a touch screen. The network interface 1240 provides a connection interface for various networked devices. The storage interface 1250 provides a connection interface for external storage devices such as an SD card and a USB flash disk.

Embodiments of the present disclosure further provides a computer-readable storage medium on which a computer program is stored, characterized in that the program when executed by a processor implements any one of the foregoing information acquisition methods.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. An information acquisition device, comprising:
 a photographing module configured to take an image in response to acquiring a photographing instruction;
 a light source driver configured to, in response to acquiring a supplementary lighting instruction, drive a light source connected to the light source driver to emit light according to a luminance parameter in the supplementary lighting instruction; and
 an image processor connected with the photographing module and the light source driver and configured to adjust the luminance parameter according to the image, send the photographing instruction to the photographing module, and send the supplementary lighting instruction including the adjusted luminance parameter to the light source driver, if photographing quality of the image taken by the photographing module does not meet a preset condition, wherein the image processor is further configured to adjust the luminance parameter according to contrast and grayscale information of the image.

2. The information acquisition device according to claim 1, wherein the image processor is further configured to:
 in condition that the contrast of the image is lower than a preset contrast value, decrease the luminance parameter if a pixel proportion of low grayscale regions of the image is lower than a preset low grayscale value, and increase the luminance parameter if a pixel proportion of high grayscale regions of the image is lower than a preset high grayscale value; or
 in condition that the contrast of the image is lower than the preset contrast value, decrease the luminance parameter if an average grayscale value of the image is greater than a preset upper grayscale limit, and increase the luminance parameter if the average grayscale value of the image is less than a preset lower grayscale limit.

3. The information acquisition device according to claim 1, wherein the image processor is further configured to send the photographing instruction to the photographing module and send the supplementary lighting instruction to the light source driver in response to receiving an information acquisition instruction from a main controller of a robot.

4. The information acquisition device according to claim 1, wherein the image processor is further configured to recognize target information from the image if the photographing quality meets the preset condition.

5. The information acquisition device according to claim 1, wherein the image processor is further configured to identify a category to which a device in the image belongs; determine a target region in the image; recognize target information from the target region using a model corresponding to the category to which the device in the image belongs if the photographing quality meets the preset condition.

6. The information acquisition device according to claim 5, wherein the image processor is further configured to adjust the luminance parameter using an adjustment step corresponding to the category to which the device in the image belongs if the photographing quality of the target region does not meet the preset condition.

7. The information acquisition device according to claim 1, further comprising:
 a light source connected to the light source driver and configured to emit light as driven by the light source driver.

8. An information acquisition device, comprising:
 a photographing module configured to take an image in response to acquiring a photographing instruction;
 a light source driver configured to, in response to acquiring a supplementary lighting instruction, drive a light source connected to the light source driver to emit light according to a luminance parameter in the supplementary lighting instruction;
 an image processor connected with the photographing module and the light source driver and configured to adjust the luminance parameter according to the image, send the photographing instruction to the photographing module, and send the supplementary lighting instruction including the adjusted luminance parameter to the light source driver, if photographing quality of the image taken by the photographing module does not meet a preset condition; and
 a supplementary lighting controller configured to obtain the supplementary lighting instruction from the image processor, determine the luminance parameter and add the determined luminance parameter to the supplementary lighting instruction if the luminance parameter is not included in the supplementary lighting instruction, and send the supplementary lighting instruction to a light source driving circuit.

9. The information acquisition device according to claim 8, further comprising:
 a light intensity sensor configured to sense an ambient light intensity and send the ambient light intensity to the supplementary lighting controller, so that the supplementary lighting controller determines the luminance parameter according to the ambient light intensity.

10. A patrol robot, comprising:
 an information acquisition device according to claim 1; and
 a main controller configured to receive and store target information from an image acquired by the information acquisition device.

11. The patrol robot according to claim 10, wherein the main controller is further configured to send an information acquisition instruction to the image processor of the information acquisition device, wherein the information acquisition instruction is used to instruct the image processor to send the photographing instruction to the photographing module and send the supplementary lighting instruction to the light source driver.

12. The patrol robot according to claim 11, wherein the main controller is further configured to instruct the patrol robot to travel according to a preset path comprising one or more information acquisition points, and send the information acquisition instruction to the image processor in response to the patrol robot reaching one of the information acquisition points.

13. The patrol robot according to claim 12, wherein the main controller is further configured to control the patrol robot to stop or decelerate when the patrol robot reaches one of the information acquisition points and control the patrol robot to travel to a next information acquisition point at a preset speed in response to receiving the target information recognized by the image processor from the image.

14. An information acquisition method, comprising:
   determining photographing quality of an acquired image;
   adjusting a luminance parameter used by a light source driver according to the image, sending a photographing instruction to a photographing module, and sending a supplementary lighting instruction including the adjusted luminance parameter to the light source driver, if the photographing quality does not meet a preset condition, wherein the photographing instruction is used to instruct the photographing module to take the image, and the supplementary lighting instruction is used to instruct the light source driver to drive a light source to emit light, wherein the luminance parameter is adjusted according to contrast and grayscale information of the image.

15. The information acquisition method according to claim 14, further comprising:
   recognizing target information from the image if the photographing quality meets the preset condition.

16. The information acquisition method according to claim 15, wherein
   the information acquisition method further comprises:
      identifying a category to which a device in the image belongs, and determining a target region from the image; and
   recognizing target information from the target region using a model corresponding to the category to which the device in the image belongs if the photographing quality meets the preset condition.

17. An information acquisition device, comprising:
   a memory; and
   a processor coupled to the memory, the processor configured to, based on instructions stored in the memory, carry out the information acquisition method according to claim 14.

18. A non-transitory computer-readable storage medium on which a computer program is stored, which when executed by a processor implements the information acquisition method according to claim 14.

* * * * *